(12) United States Patent
Liu et al.

(10) Patent No.: US 8,421,765 B2
(45) Date of Patent: Apr. 16, 2013

(54) TOUCH SENSING DEVICE AND METHOD

(75) Inventors: Chi Kang Liu, Hsinchu Hsien (TW); Guo-Kiang Hung, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 347 days.

(21) Appl. No.: 12/692,309

(22) Filed: Jan. 22, 2010

(65) Prior Publication Data

US 2010/0188366 A1   Jul. 29, 2010

(30) Foreign Application Priority Data

Jan. 23, 2009   (TW) ................................ 98102737 A

(51) Int. Cl.
*G06F 3/041* (2006.01)
(52) U.S. Cl.
USPC ........... 345/173; 345/174; 345/175; 345/176; 345/177; 345/178; 178/18.01; 178/18.02; 178/18.03; 178/18.04; 178/18.05; 178/18.06

(58) Field of Classification Search .......... 345/173–178; 178/18.01–18.06
See application file for complete search history.

(56) References Cited

U.S. PATENT DOCUMENTS

| 6,359,616 | B1 * | 3/2002 | Ogura et al. | 345/173 |
| 2005/0017957 | A1 * | 1/2005 | Yi | 345/173 |
| 2007/0182719 | A1 * | 8/2007 | Lee et al. | 345/173 |

* cited by examiner

*Primary Examiner* — William Boddie
*Assistant Examiner* — Saifeldin Elnafia
(74) *Attorney, Agent, or Firm* — Han IP Law PLLC

(57) ABSTRACT

A touch sensing device capable of accurately detecting a touched position on a touch panel includes a touch panel, a conversion unit and a calculation unit. The touch panel having a plurality of horizontal sensing lines and vertical sensing lines generates a plurality of horizontal sensing signals and vertical sensing signals in response to a touch on the touch panel. The conversion unit generates a plurality of two-dimensional (2D) sensing signals according to the horizontal and vertical sensing signals. The calculation unit determines a touched position on the touch panel according to the 2D sensing signals.

14 Claims, 5 Drawing Sheets obtained clock cycles

| X1 | X2 | X3 | X4 | X5 |
|---|---|---|---|---|
| 100 | 110 | 103 | 100 | 100 |
| Y1 | Y2 | Y3 | Y4 | Y5 |
| 100 | 110 | 105 | 103 | 100 | variance of clock cycles

| X1 | X2 | X3 | X4 | X5 |
|---|---|---|---|---|
| 0 | 10 | 3 | 0 | 0 |
| Y1 | Y2 | Y3 | Y4 | Y5 |
| 0 | 10 | 5 | 3 | 0 |

2D products

|    | X1 | X2 | X3 | X4 | X5 |
|----|----|----|----|----|----|
| Y1 | 0  | 0  | 0  | 0  | 0  |
| Y2 | 0  | 100| 30 | 0  | 0  |
| Y3 | 0  | 50 | 15 | 0  | 0  |
| Y4 | 0  | 30 | 9  | 0  | 0  |
| Y5 | 0  | 0  | 0  | 0  | 0  |

FIG.3

TOUCH SENSING DEVICE AND METHOD

CROSS REFERENCE TO RELATED PATENT APPLICATION

This patent application is based on Taiwan, R.O.C. patent application No. 098102737 filed on Jan. 23, 2009.

TECHNICAL FIELD

The present disclosure relates to a touch panel, and more particularly, to a touch sensing device and method applied to a touch panel.

BACKGROUND OF THE DISCLOSURE

In recent years, touch panels serving as input devices are gradually applied to various electronic devices such as mobile phones, personal digital assistants (PDAs), and tablet personal computers (tablet PC). When a touch panel serves as an input device, several operation approaches can be applied for instructing an electronic device to perform various operations. For example, sliding on the touch panel means moving, tapping the touch panel once means clicking a left mouse button, tapping the touch panel twice means clicking a right mouse button, and tapping and sliding on the touch panel means dragging. However, in order to perform the foregoing operation approaches smoothly, a touched position at each of time points needs to be accurately detected on the touch panel so that which operation approach is to be performed can be determined. For example, a direction and a distance are determined according to touched positions at successive time points when sliding is performed on the touch panel.

In addition, the touch panel is often used in a portable electronic device, thus making power consumption of the touch panel being an important factor that affects efficiency of the electronic device.

SUMMARY OF THE DISCLOSURE

In view of the foregoing issues, one object of the present disclosure is to provide a touch sensing device and method for accurately detecting a touched position on a touch panel.

Another object of the present disclosure is to provide a touch sensing device and method for power saving purposes.

A touch sensing device according to the present disclosure comprises a touch panel, a conversion unit and a calculation unit. The touch panel having a plurality of horizontal sensing lines and vertical sensing lines correspondingly generates a plurality of horizontal sensing signals and vertical sensing signals in response to a touch on the touch panel. The conversion unit coupled to the touch panel generates a plurality of two-dimensional (2D) sensing signals according to the horizontal and vertical sensing signals. Each of the 2D sensing signals is determined according a product of one of the horizontal sensing signals multiplied with one of the vertical sensing signals. The calculation unit coupled to the conversion unit calculates a touched position on the touch panel according to the 2D sensing signals.

Moreover, a touch sensing method is provided according the present disclosure. The touch sensing method comprises sensing a touch on a touch panel to generate a plurality of horizontal sensing signals and vertical sensing signals, each of the horizontal sensing signal being corresponding to a vertical coordinate and each of the vertical sensing signal being corresponding to a horizontal coordinate; generating a plurality of 2D sensing signals according to the horizontal sensing signals and vertical sensing signals, each of the 2D sensing signals being determined according to a product of one of the horizontal sensing signals multiplied with one of the vertical sensing signals; and determining a touched position on the touch panel according to the 2D sensing signals.

BRIEF DESCRIPTION OF THE DRAWINGS

FIG. 3 is an illustration of calculating a touched position by the touch sensing device in FIG. 1 when the capacitive touch panel in FIG. 2A is used.

DETAILED DESCRIPTION OF THE PREFERRED EMBODIMENT

Figure 1:
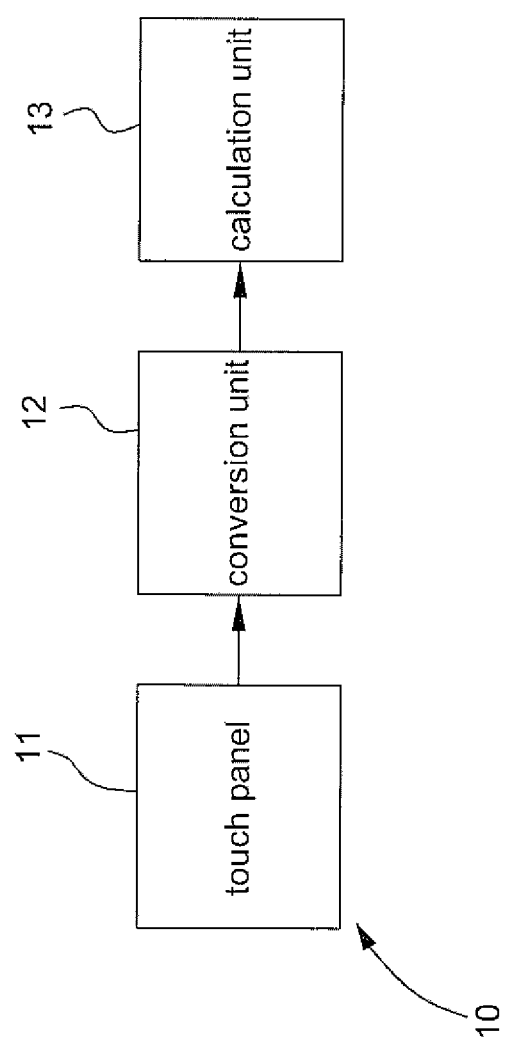
FIG. 1 is a block diagram of a touch sensing device in accordance with an embodiment of the present disclosure.

FIG. 1 is a block diagram of a touch sensing device in accordance with an embodiment of the present disclosure. A touch sensing device 10 comprises a touch panel 11, a conversion unit 12 and a calculation unit 13. The touch panel 11 comprises a plurality of vertical sensing lines and a plurality of horizontal sensing lines, and each of the vertical sensing lines corresponds to a horizontal coordinate and each of the horizontal sensing lines corresponds to a vertical coordinate. In other words, the horizontal and vertical sensing lines are alternately distributed on the touch panel 11 to form a 2D coordinate system. When a user touches the touch panel 11, the vertical and horizontal sensing lines are respectively sensed to generate corresponding vertical and horizontal sensing signals. The vertical sensing signals represent touch intensities sensed by the touch panel 11 at corresponding horizontal coordinates, and the horizontal sensing signals represent touch intensities sensed at corresponding vertical coordinates. The conversion unit 12 coupled to the touch panel 11 multiplies the vertical sensing signals by the horizontal sensing signals to generate a plurality of 2D sensing signals. That is, each of the 2D sensing signals represents a product of one vertical sensing multiplied with one horizontal sensing signal. Accordingly, the conversion unit 12 converts one-dimensional vertical and horizontal sensing signals to 2D sensing signals. Each of the 2D sensing signals represents a touch intensity sensed on a position represented by a horizontal coordinate and a vertical coordinate. In addition, by multiplying the vertical sensing signals by the horizontal sensing signals, noise components contained in the vertical and horizontal sensing signals are relieved, so that the obtained 2D sensing signals more accurately reflect a sensed result.

The calculation unit 13 coupled to the conversion unit 12 calculates a touched position on the touch panel according to 2D sensing signals generated by the conversion unit 12. A horizontal coordinate of the touched position is determined according to the 2D sensing signals and corresponding horizontal coordinates, and a vertical coordinate of the touched position is determined according to the 2D sensing signals and corresponding vertical coordinates. In this embodiment, the horizontal coordinate of the touched position is a quotient obtained by dividing a sum of products of the 2D sensing signals and the corresponding horizontal coordinates by a sum of the 2D sensing signals. The vertical coordinate of the touched position is a quotient obtained by dividing a sum of products of the 2D sensing signals and the corresponding vertical coordinates by the sum of the 2D sensing signals, so as to accurately calculate the touched position. After calculating the horizontal and vertical coordinates of the touched position, the calculation unit 13 transmits the information to a microprocessor (not shown) in an electronic device, so as to interpret the information (e.g. moving or dragging) to perform a corresponding operation accordingly.

For example, suppose that the touch panel 11 comprises three vertical sensing lines and two horizontal sensing lines respectively corresponding to horizontal coordinates X1 to X3 and vertical coordinates Y1 and Y2. Accordingly, vertical sensing signals and horizontal sensing signals a1 to a3 and b1 and b2 are respectively generated. Therefore, the conversion unit 12 generates six 2D sensing signals a1*b1, a1*b2, a2*b1, a2*b2, a3*b1, and a3*b2. A horizontal coordinate X and a vertical coordinate Y, of a touched position, generated by the calculation 13, are respectively represented by Formula 1 and Formula 2:

$$X=(a1*b1*X1+a1*b2*X1+a2*b1*X2+a2*b2*X2+a3*b1*X3+a3*b2*X3)/(a1*b1+a1*b2+a2*b1+a2*b2+a3*b1+a3*b2) \quad \text{(Formula 1)}$$

$$Y=(a1*b1*Y1+a1*b2*Y2+a2*b1*Y1+a2*b2*Y2+a3*b1*Y1+a3*b2*Y2)/(a1*b1+a1*b2+a2*b1+a2*b2+a3*b1+a3*b2) \quad \text{(Formula 2)}$$

In this embodiment, the conversion unit 12 compares each of the horizontal sensing signals with a horizontal threshold, and selects only a part of the horizontal sensing signals. For example, horizontal sensing signals greater than the horizontal threshold are selected, and others are removed. Similarly, the conversion unit 12 compares each of the vertical sensing signals with a vertical threshold, and selects a part of the vertical sensing signals. For example, vertical sensing signals greater than the vertical threshold are selected, and others are removed. The conversion unit 12 then generates 2D sensing signals according to the selected horizontal and vertical sensing signals.

In another embodiment, the calculation unit 13 compares each of the 2D sensing signals with a 2D threshold, and selects a part of the 2D sensing signals to calculate the touched position. For example, the 2D sensing signals greater than the 2D threshold are selected, and the 2D sensing signals that are not selected are not taken into consideration. The foregoing horizontal threshold, vertical threshold and 2D threshold can remove rather small or insignificant sensing signals. The conversion unit 12 selects horizontal and vertical sensing signals according to a horizontal threshold and a vertical threshold, and the calculation unit 13 selects 2D sensing signals according to a 2D threshold in order to substantially simply calculation.

Figure 2A:
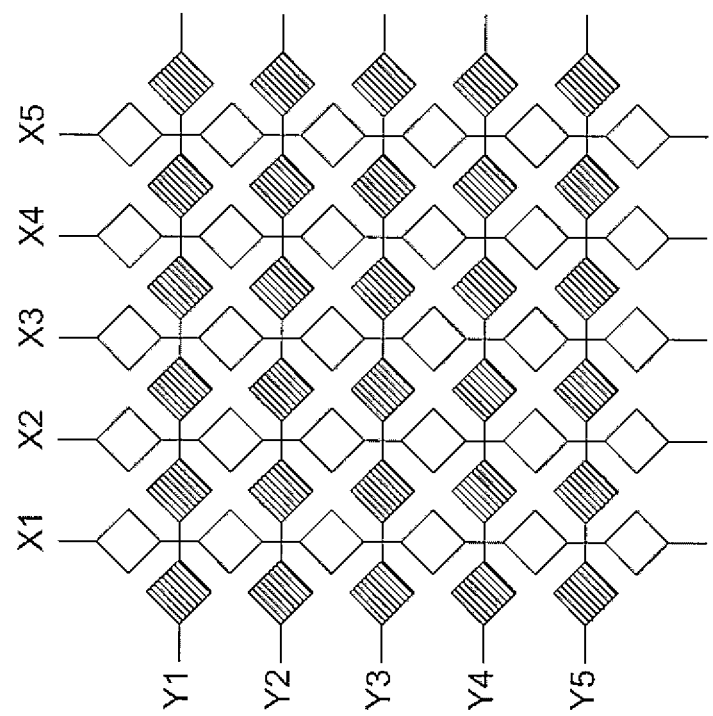
FIG. 2A is a schematic diagram of a capacitive touch panel.

In this embodiment, the touch panel 11 is a capacitive touch panel 14 as illustrated in FIG. 2A. The capacitive touch panel 14 comprises M vertical sensing lines and N horizontal sensing lines (e.g. M=N=5 in FIG. 2A) corresponding to horizontal coordinates X1 to X5 and vertical coordinates Y1 to Y5. In the capacitive touch panel 14, each of the vertical and horizontal sensing lines possesses an equivalent capacitor. When a user touches the capacitive touch panel 14, capacitance values of the equivalent capacitors are changed, and the vertical and horizontal sensing signals generated by the vertical and horizontal sensing lines represent capacitance variances of equivalent capacitors. As capacitance variance of an equivalent capacitor of a vertical or horizontal sensing line becomes greater, it indicates that a corresponding horizontal or vertical horizontal is closer to the touched position.

Figure 2B:
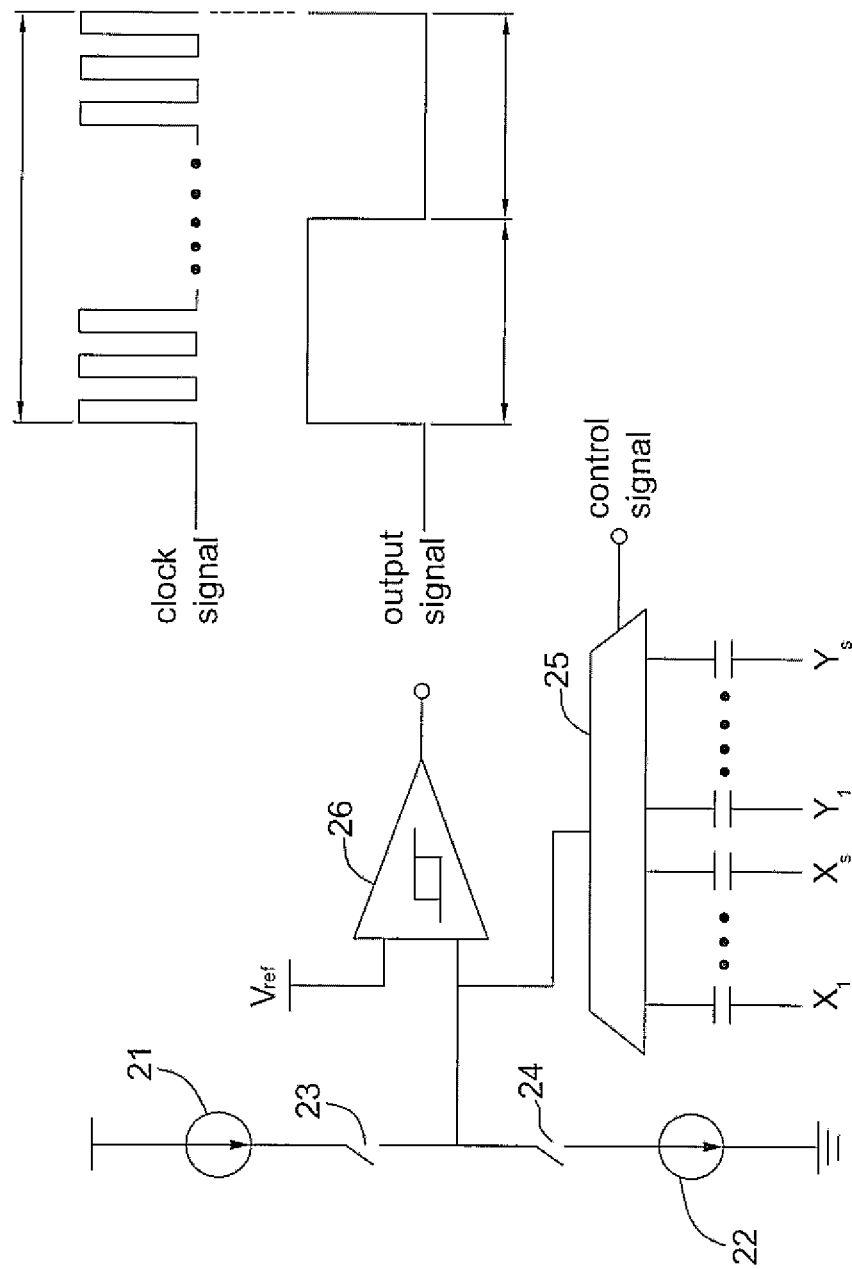
FIG. 2B is a schematic diagram of a sensing circuit inside the capacitive touch panel illustrated in FIG. 2A.

FIG. 2B is a schematic diagram of a sensing circuit inside the capacitive touch panel 14 in FIG. 2A. Each of the equivalent capacitors of the vertical sensing lines and horizontal sensing lines, corresponding to X1 to X5 and Y1 to Y5, of the capacitive touch panel 14 is coupled a multiplexer 25 and is switched by a control signal. An output of the multiplexer 25 is coupled to an input end of a hysteresis comparator 26, and the other input end of the hysteresis comparator 26 is coupled to a reference voltage source Vref. When the multiplexer 25 is switched to a certain equivalent capacitor, a switch 23 is closed and a switch 24 is open to charge the equivalent capacitor by a current source 21. At this point, a potential of the equivalent capacitor is lower than an upper limit of a hysteresis band of the hysteresis comparator 26, and thus an output signal of the hysteresis comparator 26 is high. When the equivalent capacitor is charged up to the upper limit of the hysteresis band, the output signal of the hysteresis comparator 26 is low, and the switch 24 is closed and the switch 23 is open to discharge the equivalent capacitor via the current source 22. When the equivalent capacitor is discharged to a lower limit of the hysteresis band, the output signal of the hysteresis comparator 26 is restored to high. For example, the capacitive touch panel 14 may comprise a fast clock signal and a counter (not shown) to count the number of clock cycles within the charge and discharge process. The counter may count the number of clock cycles within the charge and discharge process of the equivalent capacitor, and the number of the clock cycles represents a touch sensing frequency generated by the equivalent capacitor.

When the user touches the capacitive touch panel 14, capacitance of the equivalent capacitors of the vertical and horizontal sensing line near the touched position becomes larger, such that time of charge and discharge processes of the equivalent capacitors becomes longer and the number of clock cycles becomes greater. Therefore, variances of the number of clock cycles may represent changes in the capacitance values of the equivalent capacitors. That is, vertical and horizontal sensing signals generated by vertical sensing lines and horizontal sensing lines, corresponding to X1 to X5 and Y1 to Y5, represent the variances of the number of clock cycles, which are to be used for generating 2D sensing signals by the conversion unit 12 and calculating the touched position by the calculation unit 13. When the capacitive touch panel 14 is touched, the multiplexer 25 switches to each of the equivalent capacitors of the vertical and horizontal lines, and the sensing circuit illustrated in FIG. 2B may respectively count the number of clock cycles within a charge and discharge process of each of the equivalent capacitors. According to the numbers of clock cycles obtained, a variance of counting clock cycles is calculated by subtracting the numbers of clock cycles within a charge and discharge process of an equivalent capacitor whether the capacitive touch panel is touched or not.

Since the conversion unit 12 converts an one-dimensional sensing signal to a 2D sensing signal, the capacitive touch panel 14 switches to each of the one-dimensional equivalent capacitors to calculate the number of clock cycles (such as 5+5=10 times in FIG. 2A) instead of respectively calculating each of the 2D positions (such as 5*5=25 times in FIG. 2A). Consequently, although calculating the number of clock cycles is rather time consuming, the foregoing embodiments save power.

FIG. 3 illustrates calculation of a touched position by the touch sensing device 10 in FIG. 1. When the capacitive touch panel 14 is touched, the sensing circuit 14 in FIG. 2B respectively calculates the number of clock cycles during a charge and discharge process of equivalent capacitors corresponding to X1 to X5 and Y1 to Y5. According to the numbers of clock cycles obtained, the number (such as 100) of clock cycles when the capacitive touch panel is not touched is subtracted to calculate the variance in the number of clock cycles. The variances corresponding to X1 to X5 are vertical sensing signals, and the variances corresponding to Y1 to Y5 are horizontal sensing signals. The conversion unit 12 multiplies variances corresponding to X1 to X5 by those corresponding to Y1 to Y5 to generate 25 2D products, which are 2D sensing signals. As mentioned above, the calculation unit 13 compares each of the 2D sensing signals with a threshold to remove certain small 2D sensing signals, so as to simplify calculation and eliminate effects of noises. Referring to FIG. 3, when the threshold is 20, the calculation unit 13 selects 2D products corresponding to (X2, Y2), (X2, Y3), (X2, Y4) and (X3, Y2) to calculate a horizontal coordinate X and a vertical coordinate Y of the touched position according to the foregoing Formula 1 and Formula 2:

$$X=(100*X2+50*X2+30*X2+30*X3)/(100+50+30+30)$$

$$Y=(100*Y2+50*Y3+30*Y4+30*Y2)/(100+50+30+30)$$

It is to be noted that, the conversion unit 12 may also remove certain small variances in the number of clock cycles (i.e. vertical or horizontal sensing signals) according to the vertical or horizontal threshold disclosed according to the foregoing embodiments to simplify calculation and eliminate effects of noises.

Figure 4:
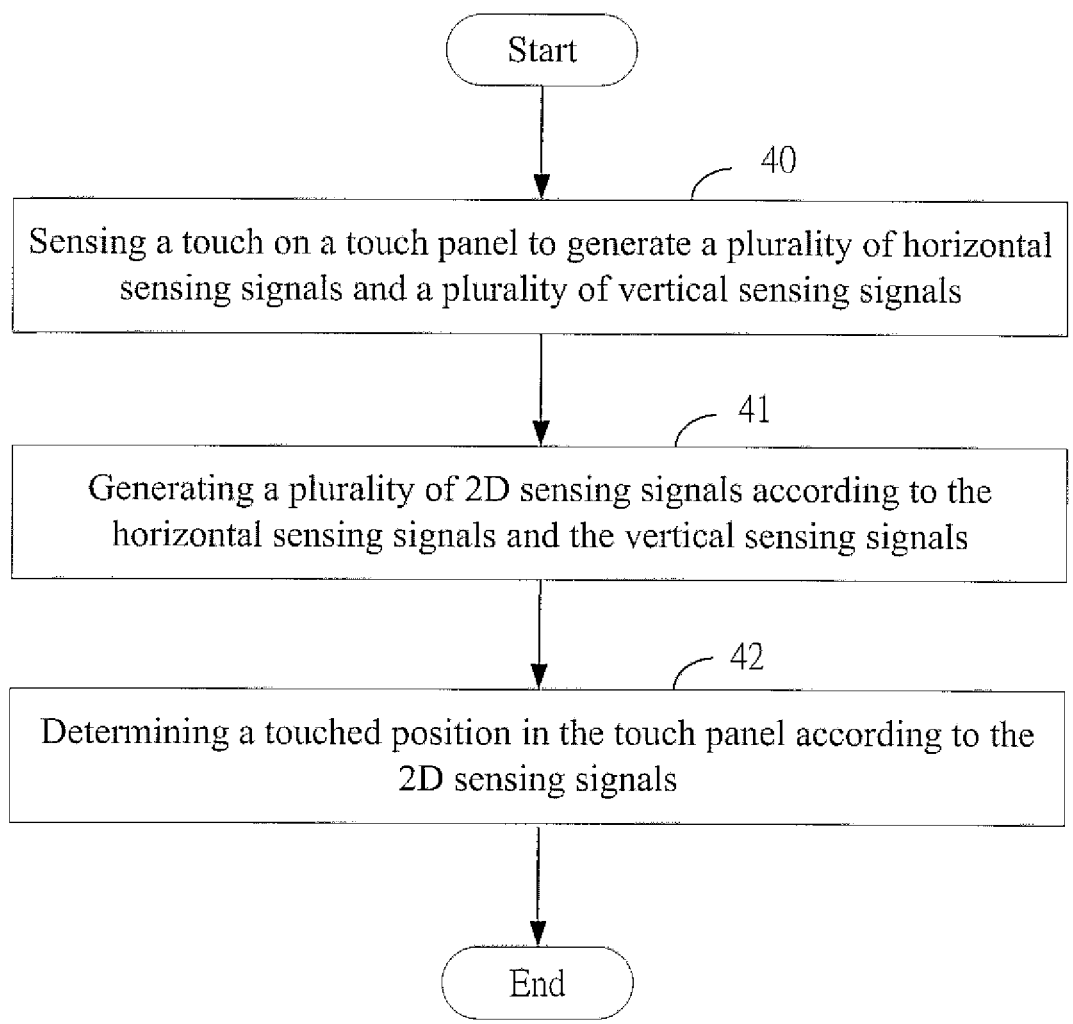
FIG. 4 is a flowchart of a touch sensing method in accordance with a preferred embodiment of the present disclosure.

FIG. 4 is a flowchart of a touch sensing method in accordance with a preferred embodiment of the present disclosure. The touch sensing method comprises steps below. In Step 40, a touch on a touch panel is sensed to generate a plurality of horizontal sensing signals and a plurality of vertical sensing signals. Each of the horizontal sensing signals corresponds to a vertical coordinate, and each of the vertical sensing signals corresponds to a horizontal coordinate. In Step 41, a plurality of 2D sensing signals are generated according to the horizontal sensing signals and the vertical sensing signals. Each of the 2D sensing signals is determined according to a product of one of the horizontal sensing signals multiplied with one of the vertical sensing signals. Preferably, at least one of the horizontal sensing signals is selected by comparing the horizontal sensing signals with a horizontal threshold to generate the plurality of 2D sensing signals. Alternatively, at least one of the vertical sensing signals is selected by comparing the vertical sensing signals with a vertical threshold to generate the plurality of 2D sensing signals, so as to simplify calculation and eliminate effects of noises. In Step 42, a touched position in the touch panel is determined according to the 2D sensing signals, and a horizontal coordinate of the touched position is a quotient obtained by dividing a sum of products of the 2D sensing signals and the corresponding horizontal coordinates by a sum of the 2D sensing signals. A vertical coordinate of the touched position is a quotient obtained by dividing a sum of products of the 2D sensing signals and the corresponding vertical coordinates by a sum of the 2D sensing signals. Preferably, at least one of the 2D sensing signals is selected by comparing the 2D sensing signals with a 2D threshold to calculate the touched position, so as to simplify calculation and eliminate effects of noises.

In conclusion, a touch sensing device provided by the present disclosure comprises a touch panel, a conversion unit and a calculation unit. The touch panel comprising a plurality of horizontal sensing lines and a plurality of vertical horizontal sensing lines correspondingly generates a plurality of horizontal sensing signals and a plurality of vertical sensing signals when the touch panel is touched. The conversion unit coupled to the touch panel generates a plurality of 2D sensing signals according to the horizontal sensing signals and the vertical sensing signals. Each of the 2D sensing signals is determined according a product of one of the horizontal sensing signals and one of the vertical sensing signals. The calculation unit coupled to the conversion unit determines a touched position on the touch panel according to the 2D sensing signals.

While the disclosure has been described in terms of what is presently considered to be the most practical and preferred embodiments, it is to be understood that the disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensing device, comprising:
   a touch panel, comprising a plurality of horizontal sensing lines and a plurality of vertical sensing lines, for generating a plurality of horizontal sensing signals and a plurality of vertical sensing signals;
   a conversion unit, coupled to the touch panel, for generating a plurality of 2D sensing signals according to the horizontal sensing signals and the vertical sensing signals, wherein each of the 2D sensing signals is determined according to a product of one of the horizontal sensing signals and one of the vertical sensing signals; and
   a calculation unit, coupled to the conversion unit, for determining a touched position on the touch panel according to the 2D sensing signals;
   wherein a horizontal coordinate of the touched position is determined according to the 2D sensing signals and corresponding horizontal coordinates; and
   wherein the horizontal coordinate of the touched position is obtained by dividing a sum of products of the 2D sensing signals and the corresponding horizontal coordinates by a sum of the 2D sensing signals.

2. The touch sensing device as claimed in claim 1, wherein the conversion unit compares the horizontal sensing signals with a horizontal threshold to select at least one of the horizontal sensing signals to generate the 2D sensing signals.

3. The touch sensing device as claimed in claim 1, wherein the conversion unit compares the vertical sensing signal with a vertical threshold to select at least one of the vertical sensing signals to generate the 2D sensing signals.

4. The touch sensing device as claimed in claim 1, wherein the calculation unit compares the 2D sensing signals with a 2D threshold to select at least one of the 2D sensing signals, so as to determine the touched position.

5. The touch sensing device as claimed in claim 1, wherein a vertical coordinate of the touched position is determined according to the 2D sensing signals and corresponding vertical coordinates.

6. The touch sensing device as claimed in claim 5, wherein the vertical coordinate of the touched position is obtained by dividing a sum of products of the 2D sensing signals and the corresponding vertical coordinates by a sum of the 2D sensing signals.

7. The touch sensing device as claimed in claim 1, wherein the touch panel is a capacitive touch panel.

8. A touch sensing method, comprising:
   sensing a touch on a touch panel to generate a plurality of horizontal sensing signals and a plurality of vertical sensing signals, wherein each of the horizontal sensing signals corresponds to a vertical coordinate and each of the vertical sensing signals corresponds to a horizontal coordinate;

generating a plurality of 2D sensing signals according to the horizontal sensing signals and the vertical sensing signals, wherein each of the 2D sensing signals is determined according to a product of one of the horizontal sensing signals and one of the vertical sensing signals; and determining a touched position on the touch panel according to the 2D sensing signals;

wherein a vertical coordinate of the touched position is determined according to the 2D sensing signals and corresponding vertical coordinates;

wherein the vertical coordinate of the touched position is obtained by dividing a sum of products of the 2D sensing signals and the corresponding vertical coordinates by a sum of the 2D sensing signals.

9. The touch sensing method as claimed in claim 8, wherein the step of generating the 2D sensing signals compares the horizontal sensing signals with a horizontal threshold to select at least one of the horizontal sensing signals to generate the 2D sensing signals.

10. The touch sensing method as claimed in claim 8, wherein the step of generating the 2D sensing signals compares the vertical sensing signals with a vertical threshold to select at least one of the vertical sensing signals to generate the 2D sensing signals.

11. The touch sensing method as claimed in claim 8, wherein the step of determining the touched position in the touch panel compares the 2D sensing signals with a 2D threshold to select at least one 2D sensing signal to determine the touched position according to the at least one 2D sensing signal.

12. The touch sensing method as claimed in claim 8, wherein a horizontal coordinate of the touched position is determined according to the 2D sensing signals and corresponding horizontal coordinates.

13. The touch sensing method as claimed in claim 12, wherein the horizontal coordinate of the touched position is obtained by dividing a sum of products of the 2D sensing signals and the corresponding horizontal coordinates by a sum of the 2D sensing signals.

14. The touch sensing method as claimed in claim 8, wherein the touch panel is a capacitive touch panel.

* * * * *